UNITED STATES PATENT OFFICE.

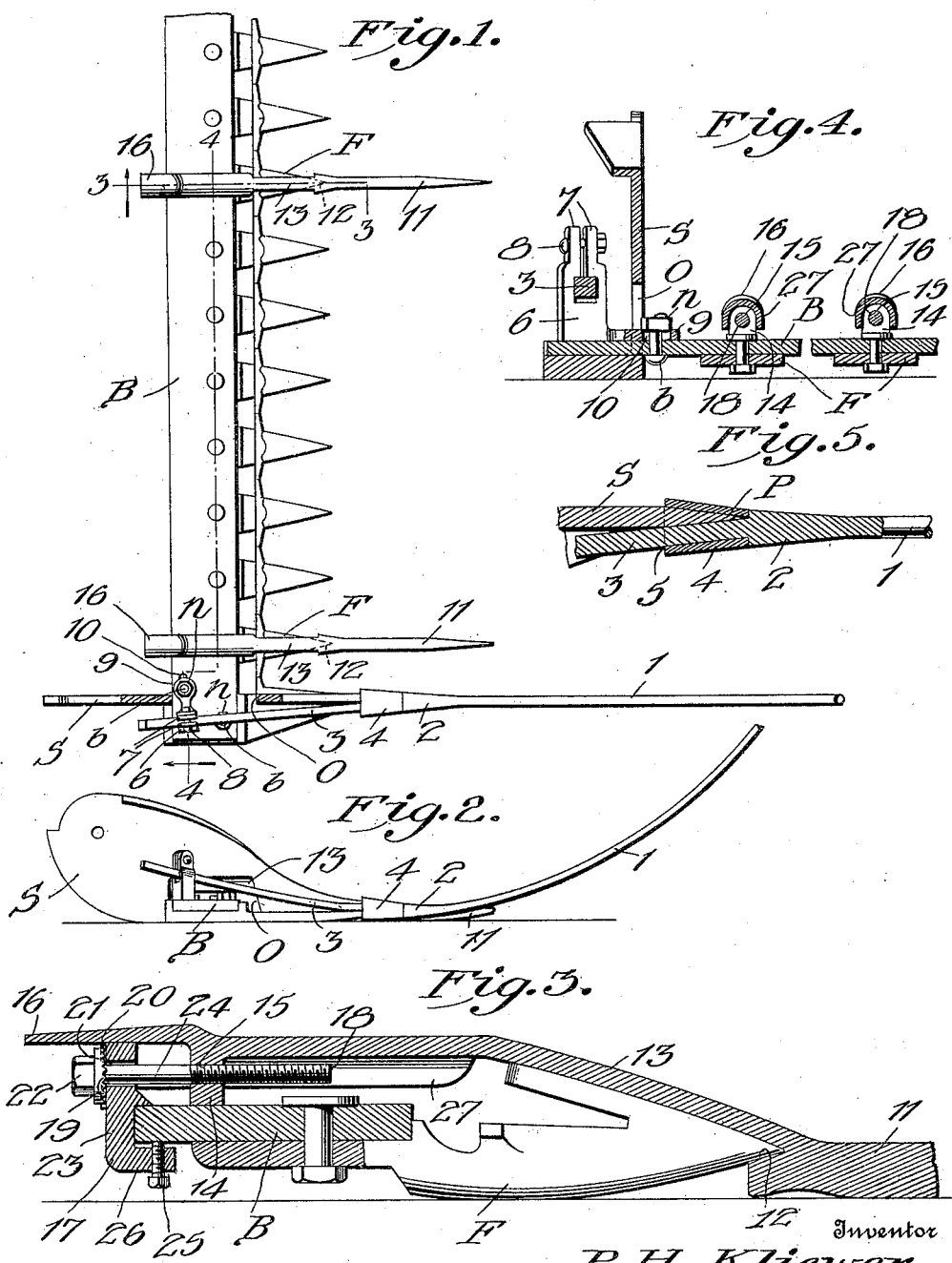

PETER H. KLIEWER, OF WOODBURN, OREGON.

ATTACHMENT FOR MOWING-MACHINES.

1,103,779. Specification of Letters Patent. Patented July 14, 1914.

Application filed March 26, 1914. Serial No. 827,417.

*To all whom it may concern:*

Be it known that I, PETER H. KLIEWER, a citizen of the United States, residing at Woodburn, in the county of Marion and State of Oregon, have invented certain new and useful Improvements in Attachments for Mowing-Machines; and I do declare the following to be a full, clear, and exact description of the invention, such as will enable others skilled in the art to which it appertains to make and use the same.

This invention relates to improvements in mowers and more particularly to attachments therefor.

It is a well known fact that in mowing a field of grass which has been beaten down by rain or wind, that the cutter bars of ordinary construction, will not raise said fallen grass to a sufficient extent to allow the knives of the sickle bar to mow the same.

The object of my invention therefore, is to overcome this difficulty by the provision of a plurality of simply constructed attachments which may readily be attached and detached and which, when in position, will leave a clearly defined line along the edge of each swath.

To the above end I employ certain novel features of construction and combination described and claimed in this specification and shown in the drawings, forming part thereof, and in which—

Figure 1 is a plan view of a portion of a cutter bar showing the application of my improved attachments thereto; Fig. 2 is an end view of the parts shown in Fig. 1; Fig. 3 is a vertical transverse section on the line 3—3 of Fig. 1; Fig. 4 is a detail longitudinal section on the line 4—4 of Fig. 1; and Fig. 5 is a detail horizontal section thereof.

In the accompanying drawings, I have shown a portion of a cutter bar B which is provided on its outer end with the usual pointed shoe S and with a plurality of forwardly projecting pointed shoes or fingers F. As clearly shown in the various figures of the drawings, the outer end of the cutter bar B passes through an opening O in the shoe S and is secured to said shoe by a pair of bolts *b*.

Extending forwardly and curving upwardly from the point P of the shoe S, is a rod 1 which is of any desired length and diameter and which is enlarged as shown at 2 and the rod is continued rearwardly from the enlarged portion 2 as shown at 3, said rearwardly extending portions being preferably, though not necessarily, square in cross section. When the parts are in position on the mower, the enlarged portion 2 lies slightly in advance of the point P of the shoe S and the portion 3 extends rearwardly therefrom substantially in contact with the outer face of the shoe S. When the parts are in this position, a sleeve 4 having an elliptical opening 5, is passed over the extension 3 and contacts, at its forward end, with the shoulder formed by the enlarged portion 2. One side wall of the opening 5 will now contact with the outer face of the rearwardly extending portion 3 and consequently, a recess or socket will remain between the opposite side wall of said opening and the inner face of the portion 3. This pocket or recess is provided for the reception of the point P of the shoe S (see Fig. 5).

For the purpose of maintaining the parts in the position so far described, I provide a clamping post 6 having a rectangular opening near its upper end, for the reception of the portion 3, the post, above said opening being slit to provide a pair of ears 7 through which a clamping screw 8 is passed. By this construction it will be seen that the portion 3 is movable within the recess in the post 6. The lower end of said post is provided with an inwardly extending attaching foot 9, the latter being provided with an elongated opening 10 which is adapted to be passed over one of the bolts *b* and to be secured in this position by one of the nuts *n* on said bolts. By this construction and arrangement of parts, it will be readily seen that, when it is desired to remove the rod 1, it is simply necessary to loosen the clamping screw 8 whereupon said rod 1 and the sleeve 4 may be entirely removed.

The function of the parts so far described, will be hereinafter more clearly set forth.

For the purpose of raising the fallen grass in advance of the cutter bar B, I provide a number of supplemental fingers 11 which, as shown in Figs. 1 and 3, form extensions for the usual shoes or fingers F. Each finger 11 is of suitable length and diameter and is provided in its rear end with a socket 12, said sockets being adapted to fit snugly over the point P' of the fingers F and to be secured in this position by means to be described.

Inclining upwardly and rearwardly from the rear end of each finger 11, is an attaching rod 13, said rods having, near their rear ends, depending lugs 14 which are provided with internally threaded bores 15. The rods 13 are continued rearwardly, from each lug 14 for the purpose of providing shields 16.

When the parts are in position upon the fingers F, the inclined portions of the rods 13 will contact with the upper faces of the fingers F and the lower ends of the lugs 14 will contact with the upper face of the cutter bar B. For the purpose of securely clamping the parts in this position, I provide substantially L-shaped clamping members 17 which are adapted to fit snugly against the rear edge of the bar B and to be secured in position, by clamping screws 18 which pass loosely through openings in the upper ends or long arms 23 of said members 17 and are threaded into the bores 15 of the lugs 14. The outer face of each of the members 17 is preferably serrated as shown at 19 for coaction with serrations 20 formed on the inner face of a washer 21, the latter underlying the head 22 of the screw 18 as clearly shown in Fig. 3. For the purpose of rendering the clamping members 17, adjustable to various thicknesses of cutter bars, I provide the upright portions or long arms 23 thereof, with inwardly extending lugs 24 which are adapted to coact with clamping screws 25 which are threaded through the horizontal portions or short arms 26 of said members. When the parts are in the above described positions, the shields 16 will overlie the upper ends of the members 17, the heads 22 and washers 21. Thus it will be seen that these elements will not retard the forward movement of the cutter bar beneath the grass which has been cut. Without this provision, it would be prone to catch some of said grass and thus prevent the cutter bar from moving freely beneath the same.

For the purpose of preventing the threads of the screws 18, from catching in the grass cut, I preferably construct the rearwardly extending portions of the rods 13 in such a manner as to provide depending shields 27 which will thus effectually prevent this objectionable feature and will also shield the threads of said screw.

When it is desired to remove the fingers 11, it is simply necessary to release the screws 18 and 25, whereupon the clamping members 17 will be free and the entire devices may be removed.

The fingers 11, may be disposed at suitable intervals throughout the length of the cutter bar B and it will clearly be seen that they will act to raise any fallen grass and support it in position to be acted upon by the sickle bar (not shown).

The upwardly curved rod 1 is provided for the purpose of bearing down, lower than the mower knife, and tangled masses of grass that stand and lean over the cutting line of the outer end of the swath. When the masses are thus borne downwardly, the tooth 11, nearest said rod 1, will raise said tangled masses sufficiently to allow the sickle bar to readily cut the same, thus forming a clearly defined line along the edge of each swath and cutting the grass before the wheels of the mower are allowed to pass over the same.

From the foregoing description, taken in connection with the accompanying drawings, the construction and operation of the invention will be readily understood without requiring a more extended explanation.

Various changes in form, proportion and minor details may be resorted to without departing from the spirit of the invention as claimed.

Having thus described my invention, what I claim as new and desire to secure by Letters Patent is:

1. A device of the character described comprising a pointed finger having a socket in its rear end, a rod extending rearwardly from said finger and having a depending lug provided with a threaded bore, a substantially L-shaped clamping member in rear of said lug and having an opening through its upright portion and a screw passing loosely through said opening and engaged with the threads in the bore of said lug.

2. A device of the character described comprising a pointed finger having a socket in its rear end, a rod extending rearwardly from said finger and having a depending lug provided with a threaded bore, a substantially L-shaped clamping member in rear of said lug and having openings through its upright and horizontal portions, the opening through said horizontal portion being threaded, a clamping screw passing through said threaded opening, an inwardly extending shoulder on said upright portion and below the opening therein and a clamping screw passing loosely through said last mentioned opening and engaged with the threads in the bore of said lug.

3. A device of the character described comprising a pointed finger having a socket in its rear end, an attaching rod inclining upwardly and rearwardly from said rear end and above said socket, a lug depending from said rod near its rear end and having a threaded bore, a substantially L-shaped clamping member in rear of said lug and beneath the rearmost portion of said rod, said member having an opening in its upright portion, a clamping screw passing loosely through said opening and engaged with the threads in the bore of said lug, an inwardly extending shoulder between said opening and the horizontal portion of said member, the latter having a threaded bore, and a clamping screw engaged therewith and adapted for coaction with said shoulder.

In testimony whereof I have hereunto set my hand in presence of two subscribing witnesses.

PETER H. KLIEWER.

Witnesses:
K. GREGERSON,
J. P. JENSEN.